United States Patent
Krishna et al.

(10) Patent No.: US 11,432,051 B2
(45) Date of Patent: Aug. 30, 2022

(54) METHOD AND SYSTEM FOR POSITIONING, VIEWING AND SHARING VIRTUAL CONTENT

(71) Applicants: Srinivas Krishna, Toronto (CA); Daniel Chantal Mills, Toronto (CA); Patel Sidhdharthkumar, Toronto (CA); Laura Beth Thomas, Toronto (CA); Pavan Jakhu, Brampton (CA); Edward Albert Rosales, Mississauga (CA); David Alexander Yue, Mississauga (CA); Naimul Mafraz Khan, Toronto (CA)

(72) Inventors: Srinivas Krishna, Toronto (CA); Daniel Chantal Mills, Toronto (CA); Patel Sidhdharthkumar, Toronto (CA); Laura Beth Thomas, Toronto (CA); Pavan Jakhu, Brampton (CA); Edward Albert Rosales, Mississauga (CA); David Alexander Yue, Mississauga (CA); Naimul Mafraz Khan, Toronto (CA)

(*) Notice: Subject to any disclaimer, the term of this patent is extended or adjusted under 35 U.S.C. 154(b) by 0 days.

(21) Appl. No.: 15/717,375

(22) Filed: Sep. 27, 2017

(65) Prior Publication Data
US 2018/0091869 A1    Mar. 29, 2018

(51) Int. Cl.
*H04N 21/81*    (2011.01)
*H04N 21/258*    (2011.01)
(Continued)

(52) U.S. Cl.
CPC ......... *H04N 21/816* (2013.01); *G06T 19/006* (2013.01); *H04N 21/25841* (2013.01);
(Continued)

(58) Field of Classification Search
CPC .......... H04N 21/816; H04N 21/25841; H04N 21/41407; H04N 21/42202; H04N 21/4223; G06T 19/006
(Continued)

(56) References Cited

U.S. PATENT DOCUMENTS 9,928,655 B1 *    3/2018    Alston ............... G06F 3/04815
2002/0120609 A1 *    8/2002    Lang et al. ............ G06F 16/30
(Continued)

FOREIGN PATENT DOCUMENTS

WO    WO2006105686 A1 *    4/2005    ............. A63F 13/00

OTHER PUBLICATIONS

Takacs et al; "Outdoors Augmented Reality on Mobile Phone using Loxel-Based Visual Feature Organization"; MIR'08; Oct. 30, 2008 (Year: 2008).*
(Continued)

*Primary Examiner* — Stephen S Hong
*Assistant Examiner* — Broderick C Anderson
(74) *Attorney, Agent, or Firm* — Tarolli, Sundheim, Covell & Tummino LLP

(57) ABSTRACT

A method and system for positioning, viewing, and sharing virtual content is provided. The method includes determining a geospatial position of the mobile device capable of determining its geospatial location. Once the geospatial position is determined content within range of the geospatial location of the mobile device is requested from a content store. A content thumbnail corresponding to the content from the content store is retrieved and then presented on the mobile device.

23 Claims, 10 Drawing Sheets

(51) Int. Cl.
*G06T 19/00* (2011.01)
*H04N 21/854* (2011.01)
*H04N 21/4725* (2011.01)
*H04N 21/414* (2011.01)
*H04N 21/472* (2011.01)
*H04N 21/422* (2011.01)
*H04N 21/431* (2011.01)
*H04N 21/4223* (2011.01)

(52) U.S. Cl.
CPC ... *H04N 21/41407* (2013.01); *H04N 21/4223* (2013.01); *H04N 21/42202* (2013.01); *H04N 21/4312* (2013.01); *H04N 21/4725* (2013.01); *H04N 21/47202* (2013.01); *H04N 21/812* (2013.01); *H04N 21/8146* (2013.01); *H04N 21/854* (2013.01)

(58) Field of Classification Search
USPC ........................................................ 715/719
See application file for complete search history.

(56) References Cited

U.S. PATENT DOCUMENTS

| | | | |
|---|---|---|---|
| 2006/0214953 A1* | 9/2006 | Crew et al. | G06T 3/40 345/660 |
| 2011/0199479 A1* | 8/2011 | Waldman | H04N 7/185 348/116 |
| 2012/0105474 A1* | 5/2012 | Cudalbu | G01C 21/3664 345/633 |
| 2012/0249741 A1* | 10/2012 | Maciocci | G06T 15/503 348/46 |
| 2013/0069944 A1* | 3/2013 | Altman | G09B 29/106 345/420 |
| 2013/0314441 A1* | 11/2013 | Grasset | G06T 1/00 345/633 |
| 2014/0164921 A1* | 6/2014 | Salinas | G06F 3/011 715/716 |
| 2015/0206343 A1* | 7/2015 | Mattila | G06T 19/006 345/420 |
| 2017/0147713 A1* | 5/2017 | Reeves | G06F 30/17 |
| 2018/0005450 A1* | 1/2018 | Daniels | G01S 19/01 |

OTHER PUBLICATIONS

T. Hollerer, S. Feiner and J. Pavlik, "Situated documentaries: embedding multimedia presentations in the real world," Digest of Papers. Third International Symposium on Wearable Computers, 1999, pp. 79-86, doi: 10.1109/ISWC.1999.806664. (Year: 1999).*

Narzt, W., Pomberger, G., Ferscha, A. et al. Augmented reality navigation systems. Univ Access Inf Soc 4, 177-187 (2006). https://doi.org/10.1007/s10209-005-0017-5 (Year: 2006).*

* cited by examiner

METHOD AND SYSTEM FOR POSITIONING, VIEWING AND SHARING VIRTUAL CONTENT

RELATED APPLICATION

This application claims priority from Canadian Patent Application No. 2,943,247, filed Sep. 27, 2017, the subject matter of which is incorporated herein by reference.

BACKGROUND

Sharing user-created content has become commonplace with the advent of the mobile device. Sites like YOUTUBE, FACEBOOK, and INSTAGRAM allow users to share thoughts, experiences, and media with other users quickly and almost instantaneously.

SUMMARY

However, content that is interesting to a user can be difficult to find. The sheer amount of user-created content is overwhelming, and finding relevant media for consumption can be cumbersome. This is especially problematic for content that is associated with a specific location. More often than not, user-created media lacks any real position or location information that can be easily accessed by a user.

What is provided is a method and a system for positioning, viewing, and sharing virtual content.

In an embodiment users can view content retrieved from a content store based on their geographic location as determined by the user's mobile device.

The content may also be retrieved using the user's geospatial location (as determined by the mobile device) and any one or a combination of user-defined search parameters or collaboratively-defined search parameters.

This content may be mixed with content being captured by the mobile device. For example, the content may be mixed with input from the mobile device's video camera and microphone before being displayed on the mobile device.

Users may also interact with content retrieved from the content store. For instance, the user can initiate a playback of the content by selecting the corresponding content thumbnail, icon, or other marker.

The user may also interact with the content.

In an embodiment the playback of the content is presented on a display of the mobile device as a viewer.

In another embodiment the content may be projected from the mobile device to a surface close to the user.

In another embodiment the content may be presented on the display of a head-mounted virtual reality or augmented reality headset.

Once retrieved from the content store, the content (as represented by thumbnails) may be displayed on the user's mobile device as markers on a map. The content may also be displayed as content thumbnails in a list. The content may also be displayed as content thumbnails in a list as an overlay on the mobile device's live video feed.

The content thumbnails may also be displayed in a slice view as an overlay on the mobile device's live video feed.

The retrieved content and/or content thumbnails may be organized in horizontal sections (or quadrants in the case of four sections) virtually surrounding the user. As the user rotates horizontally about a point, different content thumbnails, lists of content thumbnails, or slices of content thumbnails, will be displayed depending on the section or quadrant the user is facing.

The content and/or content thumbnails may be also organized in vertical sections or quadrants virtually surrounding the user. As the user rotates vertically (i.e., pitch) about a point, different content thumbnails, lists of content thumbnails, or slices of content thumbnails, will be displayed depending on the section (or quadrant if four sections) the user is facing.

In one embodiment, a method for delivering content to a mobile device is provided. The method includes determining a geospatial position of the mobile device capable of determining its geospatial location, requesting, from a content store, a content having geospatial location information that is within a range of the geospatial location of the mobile device, retrieving a content thumbnail corresponding to the content from the content store, and presenting the content thumbnail on the mobile device.

In another embodiment the user can create content with geospatial position data and upload the content to a content store. This includes determining a geospatial location of a mobile device, recording a content on the mobile device, and associating the content with the geospatial location.

A system for positioning, viewing, and sharing virtual content is also provided. The system includes a mobile device having a tracking client for determining a geospatial location, a 3D asset client for storing and interacting with 3D content retrieved from a content store, an audio client for playing audio content retrieved from the content store, a display for displaying content, and a camera for capturing live video. The content store has a tracking server for accepting requests for content from the mobile device, a 3D asset server for storing and serving content to the mobile device, and an audio server for supplying audio content to the mobile device.

FIGURE NUMBERS

Figure 1:
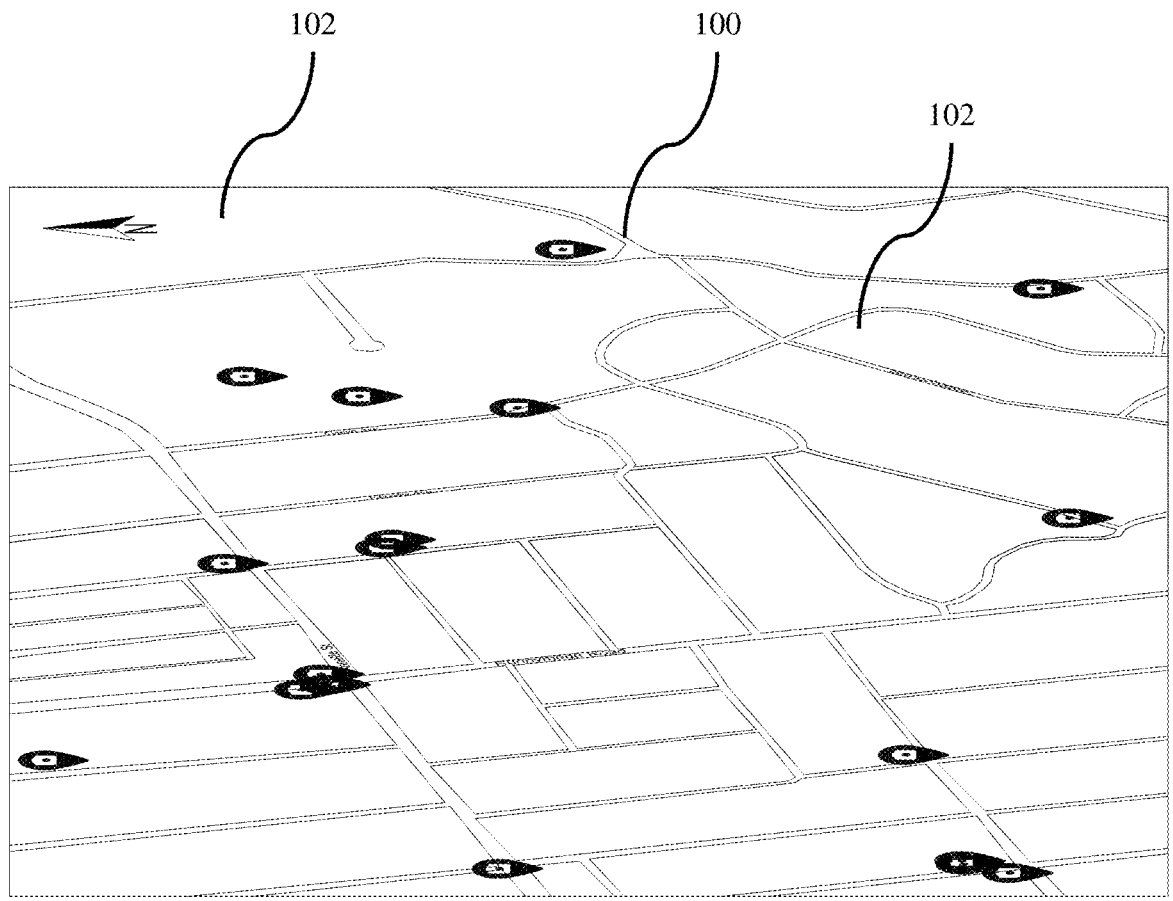
FIG. 1 is a plan view map depicting markers indicating GPS search results for geographically tagged content in the proximity of the mobile computing device.

100—map
102—marker
200—location
202—list view
204—thumbnail
206—west quadrant
208—east quadrant
210—north quadrant
400—content projected/virtual screen/virtual content viewer
402—user
500—user preference filter interface
502—collaborative filter interface
600—sliced view

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The scope of the invention is defined by the claims. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

In an embodiment a mobile device capable of determining its geospatial location is provided. Geospatial location information includes information obtained from a GPS sensor and information about a device's location, orientation, and position relative to a local 3D environment. This information can also include latitude and longitude, horizontal and/or vertical orientation, altitude/height, slope, cardinal direction, pitch, yaw, roll, local 3D environment position and orientation information, etc.

Examples of mobile devices that can determine geospatial location include, but are not limited to, GPS-enabled mobile phones, cellular devices, GPS-enabled tablets, WiFi-location capable mobile devices, laptop computers, etc.

In an embodiment the mobile device determines its geographic information and local position and orientation using on board sensors. These sensors include, but are not limited to, gyroscopic sensors, GPS sensors, video-based sensors, WiFi triangulation, RF triangulation, cell tower triangulation, etc. For example, in an embodiment, the geographic position is determined using Global Positioning Systems (GPS), other locating features like position determination from cellular tower trilateration, or a combination of the two.

In another embodiment the mobile device is in communication with sensors external to the mobile device such as standalone GPS receivers.

Once the mobile device is located geographically, other sensing is completed to model portions of the local 3D environment. This local 3D environment model is used to determine the mobile device's local position and orientation relative to the surrounding environment. This is commonly performed using the mobile device's non-GPS sensors (e.g., accelerometers, gyroscopes, compasses, video sensors, audio sensors, LiDAR, etc.).

In an embodiment, key frames taken from the video sensor will be used to calculate, in real time, the 3D position of the surrounding environment as it relates to the mobile computing device. The form of monocular position and depth sensing will be completed using common features automatically determined in the video key frames. Examples of methods of determining the 3D position of the mobile device and its surrounding environment include using simultaneous location and mapping (SLAM) techniques. These techniques are both known and commonly used in industries such as robotics and self-driving vehicles.

As the device is moved around, more key frames are identified from the video and the depth data is calculated and added to the already calculated depth data to continually improve the localized map of the surrounding environment. Given a series of device camera sensor observations over a series of time steps, the camera position is calculated as well as the depth of common pixels that can be seen in multiple keyframes.

This local position and orientation information is used, among other things, to position the content and/or content thumbnail so that it appears, from the user's perspective, to be in a correct and stationary position relative to the real-world (or local environment). The local position and orientation information is also used to ensure that the content and/or content thumbnail maintains its correct perspective relative to the mobile device's location in the local environment.

Once the geospatial information of the mobile device is known, this information is used to search a content store for geographically tagged content.

Content generally includes any geospatially-tagged content (3D, assets, 3D-animated models, etc.) stored in a content store. This includes 3D virtual assets created and operable in 3D environments. Examples of applications that allow for the creation and interaction of 3D assets in an environment include, but are not limited to, UNITY, THREEJS, APPLE ARKIT, GOOGLE ARCORE, AR.JS, etc.

Content can also include non-3D content that has been tagged with geolocation data. This content can include, but is not limited to, geospatially-tagged content on YOUTUBE.COM or any similar video service, social media website, social network, etc. For example, a search can be performed on YOUTUBE to find content (in this case, videos) that includes relevant geospatially-tagged information in any one of YOUTUBE's searchable fields, including the comments.

Thumbnail or content thumbnail generally includes a miniature representation of the content (thumbnail image, smaller version of a 3D model, representative icon or marker).

In an embodiment, the content and content thumbnails are combined with a live video capture (or feed) of the mobile device (from the camera) to provide a mixed-reality (or augmented reality AR) view. Mixing a real-world video feed with virtual content and/or content thumbnails makes the virtual content and/or content thumbnails appear as if they exist in the real world.

In another embodiment, the content and content thumbnails are rendered in a virtual representation of the location to provide a virtual reality (VR) view.

While at the geographic location, the individual can interact with the content using an input on the mobile device. This input can include, but is not limited to, using a virtual pointer, voice commands, interacting with a touchscreen, sensing "hot-spots" that are visible on the device's display or audible through the device's audio system, etc.

The content and/or content thumbnails will have a position and orientation within the local environment around the individual. The position and orientation of the mobile device will be determined and continually updated in real time using available sensors on the mobile device.

In the case where the content and/or content thumbnails are "anchored" to a position and orientation, as the mobile device moves the perspective of the virtual content will change relative to the movement of the mobile device. For example, this is applicable in the case where the content and/or content thumbnails are initially positioned according to the content's geospatial information and anchored in the content's initial position.

In the case where content "floats" or "follows" the user, then the content will maintain a fixed position on the display of the mobile device as the mobile device is moved. In this case, the content and/or content thumbnails may be initially positioned according to the content's geospatial information, but may move (e.g., following the user) as the mobile device is moved around.

In the example where the content is a 3D object or asset, the user may interact with the virtual 3D object or asset through the input of mobile device. From the user's perspective it will appear as if the 3D object exists in the real world and can be interacted with as if it exists in the real world. For instance, they can click and drag, click, pinch and/or expand, or swipe, etc the virtual content on the display of the mobile device to rotate it, move it, anchor it to a different position in the real-world, resize it, dismiss it, or otherwise manipulate it.

It will be appreciated that content (whether 2D or 3D) can be interacted with in a variety of ways. In the case of a list, for example, the user they may select, discard, or save content as a favorite by issuing voice commands such as "play", "skip" or "save as favorite" respectively. Alternately the same could be completed by tilting the smartphone in one direction to initiate play of content, tilt in another direction to discard content, and a long tilt in the same direction as the "play content" tilt to save it to the users' favorites list. Other methods of interaction include, but are not limited to, sensing where the user is looking on the device screen, sensing "hot spots" in the environment, motion gestures, gestures on the display, recognizing landmarks and points of interest in the real-world, recognizing points of interest and/or landmarks based on data from other users, etc.

The content store can be a remote server or cloud computing instance that is configured to store and retrieve data, including content and content thumbnails, associated with geospatial positioning information. The content store may also be a website, social media network, social networking website, peer-to-peer user servers or any combination of the above.

The results of the search will be displayed graphically to visually depict virtual objects/contents that are located within a specified vicinity around the individual. The results will also be displayed so that the content and/or content thumbnails are presented with the correct orientation relative to the real-world environment.

Furthermore, if multiple geographically tagged objects are found within the search region, a visual list or representation of the search results will be presented to the individual.

In the event where the correct orientation of the mobile device and/or content (or content thumbnails) is not known and/or there are multiple geographically tagged objects in the same vicinity, the results can be presented with a notification to turn towards a specified location. Once the orientation of the mobile device and/or content (or content thumbnails) has been determined, the user can then select the content (or content thumbnail) and spawn it in the desired orientation.

For instance, a content creator may upload content pertaining to a coffee shop outside of that coffee shop and input data naming that coffee shop as the subject of their content. A prompt or notification could instruct another user who wants see that content to rotate the device towards the coffee shop and trigger the placement of the content in front of it, by any number of means such as, for example, by tapping the screen. The notification or prompt of what to look at and where to place the content would be derived from the data entered by the content creator. This functionality could be on at all times of invoked only when content is geographically displaced for whatever reason, such as an excess of unrelated content at the same location or when in sliced view.

Referring now to FIG. 1, one such representation of the search results, as presented to the user, is provided. In this embodiment a map view 100 is provided. The map view is presented to the user on the mobile device. The markers 102 represent the locations within a given range of the mobile device where content/content thumbnails are available.

If a user is not within a given distance of a location associated with content and/or content thumbnails, then a user will be unable to view or interact with the content.

If, however, the user is within a given distance of a location associated with content and/or content thumbnails, then a user will be able to view or interact with the content and/or content thumbnails.

The user can modify what geographic location they are viewing content from by dragging the map to be centered on a different location or typing a search for a different area. If the user searches the map for an area outside of where the user is currently located it will provide content that is sorted in the manner already described.

In the scenario where a user would like to view content in a different geographic location than their current geographic location (by, for example, dragging the map marker or selecting a new geographic location), the user can view content and/or content thumbnails from that new location. For example, once a user changes his or her geographical location, a representative view of that location with content and/or content thumbnails relevant to that location are displayed. An example of such a representative view is, but is not limited to, the spherical or fish-eye view of GOOGLE STREETVIEW or similar.

Figure 2:
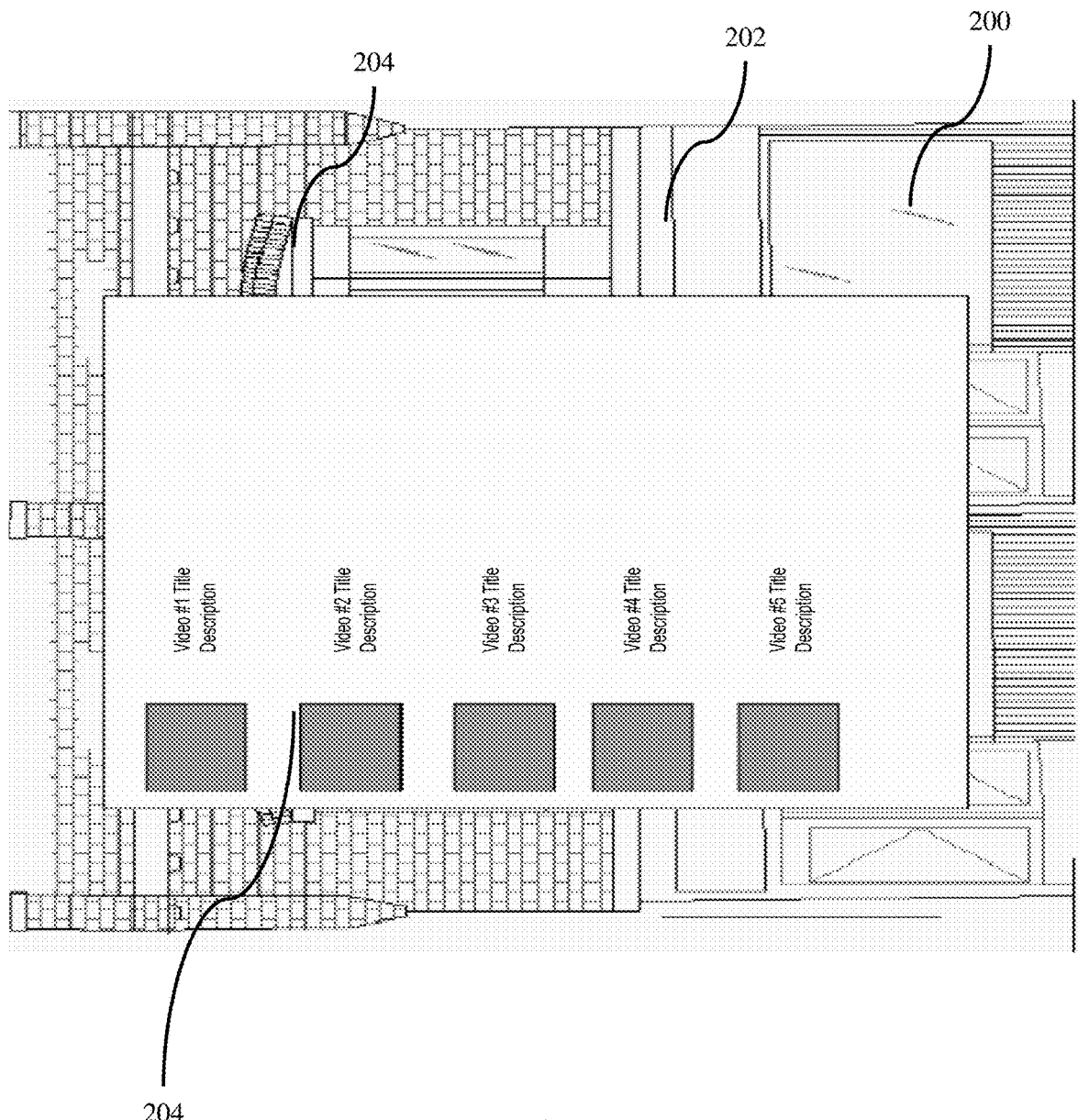
FIG. 2 depicts a list view of thumbnails of geographically tagged contents shown on the mobile computing device's viewer and overlaid on the real-world environment (as viewed through the device's video camera).

Referring now to FIG. 2, the search results are overlaid over a real-time video view (or live video capture) of the real-world location. These search results are placed in the display of the mobile device so that it appears to be in a position and orientation calculated between the user's latitude and longitude (as determined by the mobile device) and the latitude and longitude of the content.

For instance, in the embodiment depicted in FIG. 2 the content is associated with the front façade of a real-world location 200. The content is represented as thumbnails 204 displayed as a list on the mobile device. In this embodiment the thumbnails are displayed with a corresponding description describing the content of the virtual objects/content.

It will be noted that the individual will be able to select a specific content from the list of content presented in the search results. Only virtual objects/contents that are within the geographic buffer or region of interest surrounding the location of the individual will be shown. A user may be given the option to select the desired size of the region of interest, or a default may be used if no preference is provided.

The list, the content thumbnails, and descriptions are rendered on the display of the user device so that they appear to be between the user's position (as determined by the mobile device) and the front façade of the real-world location 200.

In the embodiment depicted in FIG. 2, the list view (or regular view) remains static as the user moves around the front façade of the location 200. This allows the user to be able to always interact with the content regardless of the mobile device's position relative to the front facade of the location.

In this embodiment the list view will appear to remain anchored to the real-world location 200. That is, as the user moves around the front façade of the location 200, the perspective of the list view on the display of the mobile device will change as if the list view were a permanently affixed sign to the location 200.

It will be appreciated that content having different geospatial tags is retrieved from the content store. The content (or a list of content thumbnails) are rendered according to the geospatial information associated with the content. As the user moves from one location to another the perspective of each list changes. For example as the user nears a geospatial location its associated content list appears in the center of the display of the mobile device. Content lists that are geographically to the left or right (west or east) of the nearest content list are rendered so that they appear as content lists to the left or right of the central display list.

Figure 3:
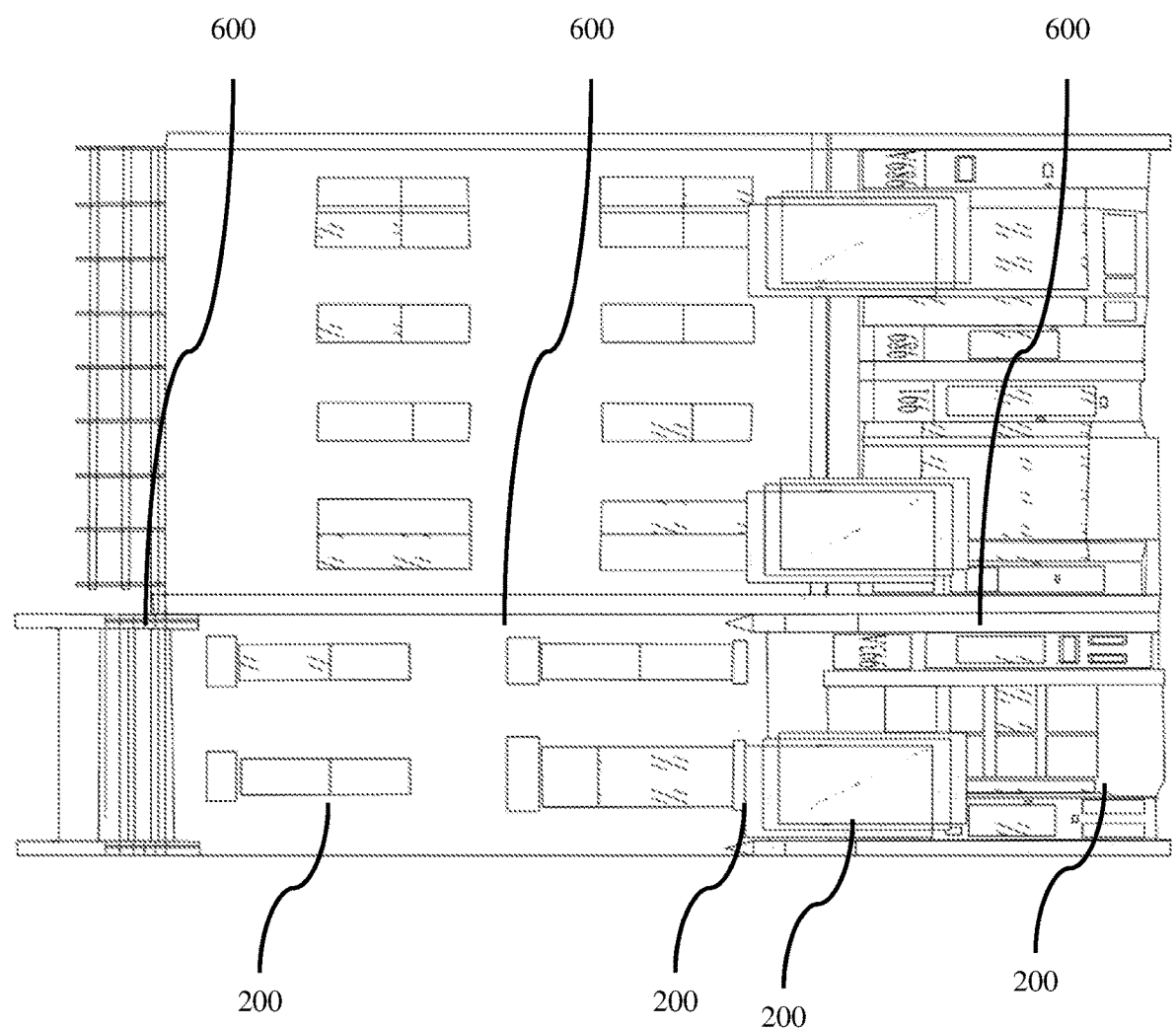
FIG. 3 depicts a sliced display view having several locations, each having geographically tagged contents associated with the specific location.

As depicted in FIG. 3, yet another way of presenting a quantity of content in a geographic area is a sliced view. This includes generating "slices" of content and/or content thumbnails and placing the slices over each other at the same location along the centre axis of the slice, making only the top slice visible in the stack. As depicted in this figure, each of the locations 200 is associated with a quantity of content. The content for each location 200 is depicted in sliced view, and the "stack" of sliced views is anchored to the location 200 so that as the user moves the mobile device, the stack does not appear to move from its original location (e.g., there is a perspective shift from the point of view of the user).

A user can interact with the system by cycling between sliced view. For example, content being shown in sliced view may be swiped by the user in a pre-determined direction (for example, to the right) to cycle to the subsequent content showing "1 of n", then "2 of n", "3 of n". If the end of the list of content is reached, "n of n", then the initial content is brought back to the front, like a carousel. If the user swipes in the opposite direction when cycling through the list, the number order of content presented will decline, "n of n", then "3 of n", "2 of n" etc.

When not in sliced view, the content is presented in regular view (as depicted in FIG. 2). In an example, regular view has all the content placed in augmented reality where it is geographically positioned relative to the user's current position and orientation. The user can swipe to the right to make an augmented reality piece of content disappear to allow other content to be easier to review.

Figure 4:
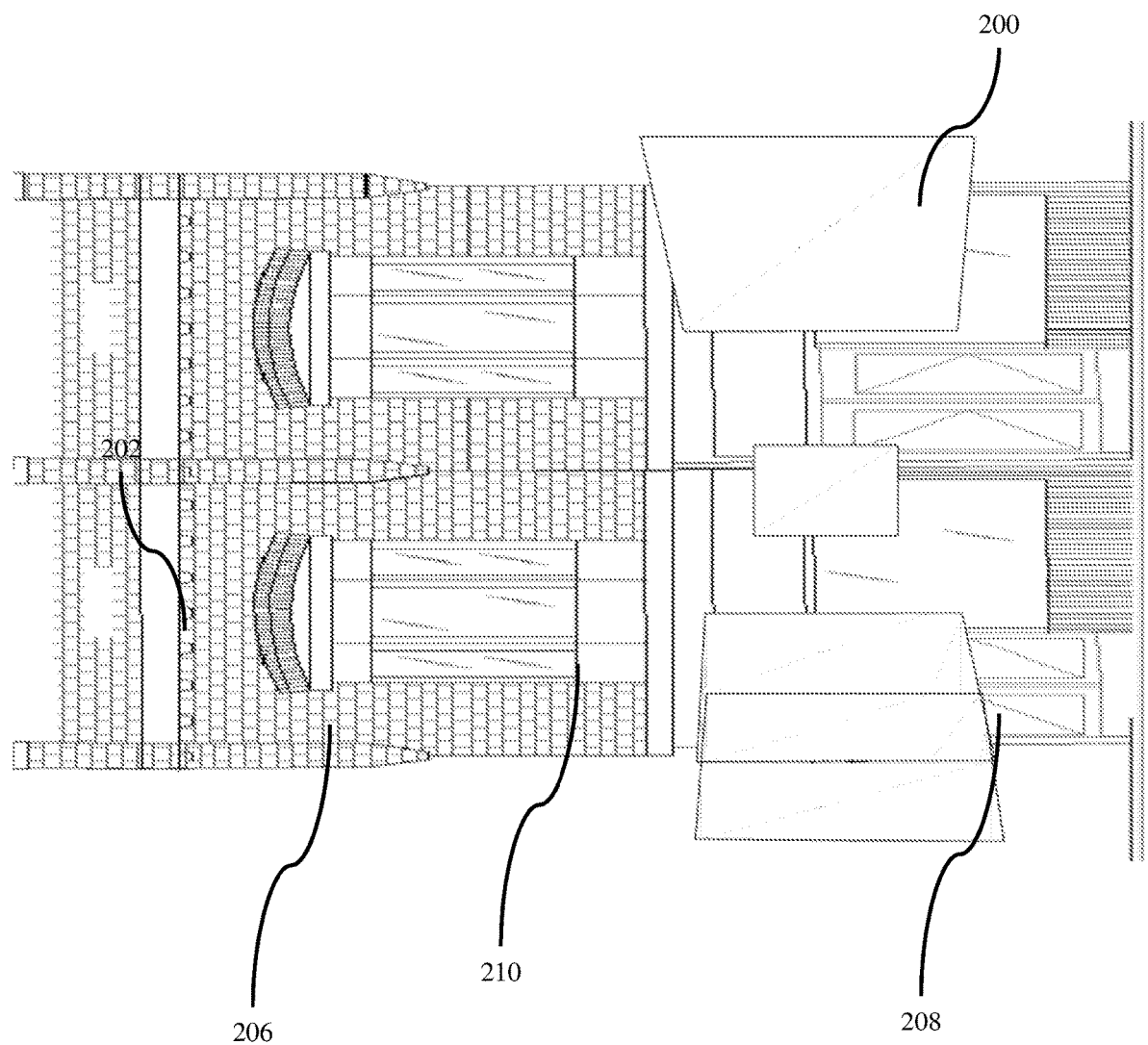
FIG. 4 depicts thumbnails of geographically tagged contents shown on the mobile device's viewer and overlaid on the real-world environment (as viewed through the mobile device's video camera) in a quadrant view.

Referring now to FIG. 4, as more virtual screens get placed at a geographic location, that virtual space will be become visually crowded. To help sort the multiple content at a location, a grouping of content is created using their geographic location and compass direction relative to the user. The groupings are organized into quadrants or refined further into groups of equal sized pie sections, (for example 6, 8 or 10 pie slices) around the user (sliced view).

In the case of groupings of mixed reality content into quadrants, each quadrant could be oriented in the example depicted in FIG. 4:

North quadrant 210—bounded between bearings of 315°, clockwise to 45° with the centre being at 0°
East quadrant 208—bounded between bearings of 45°, clockwise to 135° with the centre being at 90°
South quadrant (not shown)—bounded between bearings of 135°, clockwise to 225° with the centre being at 180°
West quadrant 206—bounded between bearings of 225°, clockwise to 315° with the centre being at 270°

It will be appreciated that more than four quadrants can be used without departing from the scope of this disclosure. For example, any different division of the slices can calculated using the following formula:

$$\text{size of slices}° = \frac{360°}{\text{\# of groupings}}$$

The centre of the northerly slice would have a bearing of 0° and the centre of subsequent slices would be measured clockwise from the 0° bearing and be incremented by size of slices.

In another embodiment, the slices are also divided along vertical axes. In this embodiment the horizon line is the default axis on which the main content is centered. Additional content slices will then occupy virtual locations above and below the main content horizon axis. For instance, content that is vertically below the main content could be another version of content, (e.g., information about business establishments that are at that location and sources from on-line databases). The content that is vertically above the main content may be newsfeed information or content from friends and contacts.

In an embodiment, once the content is playing or being interacted with, the user may swipe left at any time to return to the content thumbnails. It will be appreciated that the specific swipe direction or user interaction can be implemented in many different ways as known in the art.

Figure 5A:
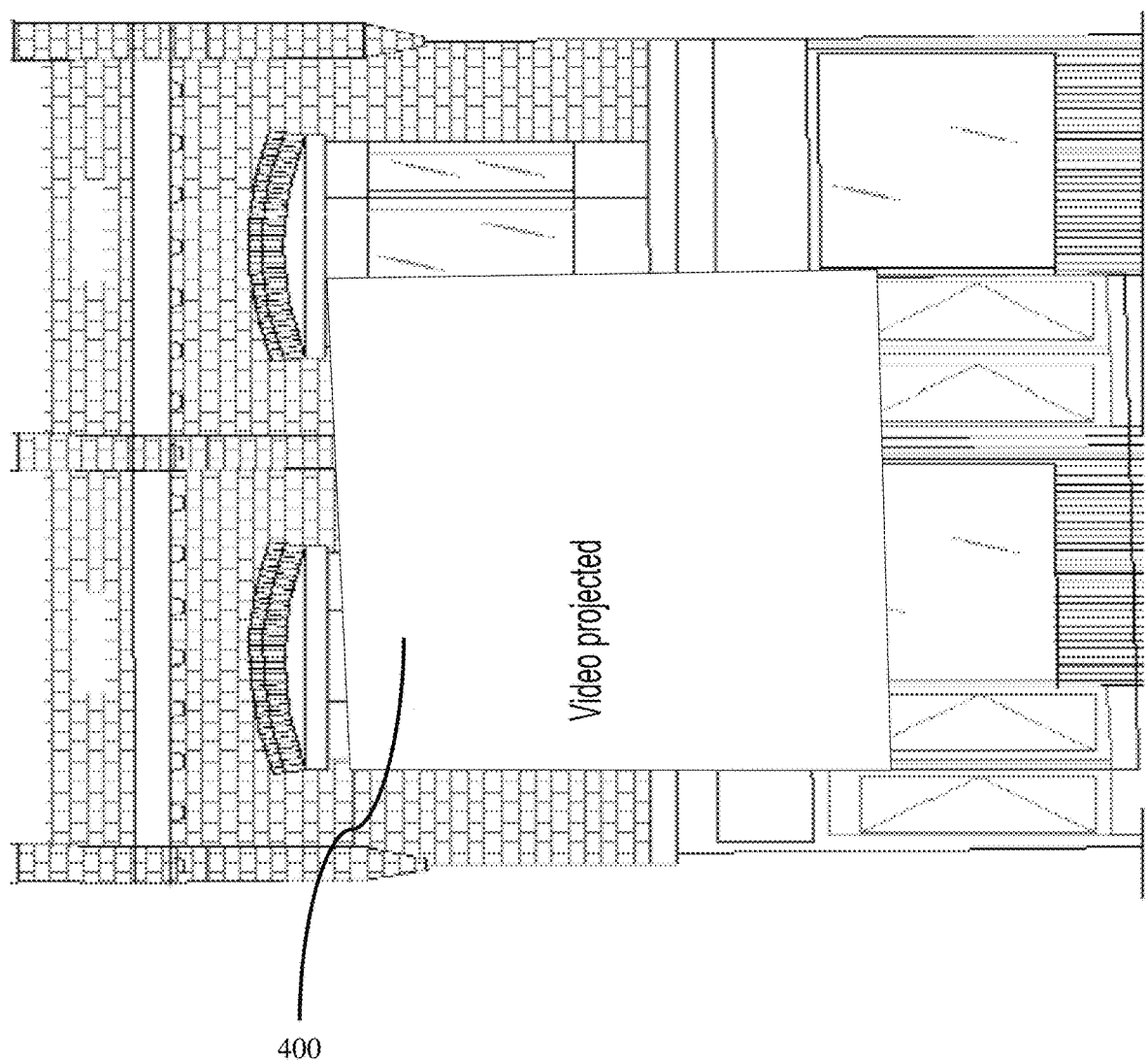
FIG. 5A depicts a content projected onto a virtual screen that remains in a stationary position relative to the real environment (as viewed through the device's video camera) as the mobile computing device is moved or rotated.

Referring now to FIG. 5A, once a content is selected from the content thumbnails, the content is presented to the user. In this example a virtual object and/or video viewer 400 is used to present the content to the user via the display of the mobile device.

In another embodiment the positional information is used to position virtual objects (e.g. 2D or 3D virtual objects, or streaming videos) and display them in a real-world video view. For example, in this embodiment a virtual object/video viewer 400 is virtually positioned in the real world so that it appears in the window or the front facade of a building. That is, a content is projected onto a virtual screen that remains in a stationary position relative to the real environment (as viewed through the device's video camera) as the mobile computing device is moved or rotated.

Figure 5B:
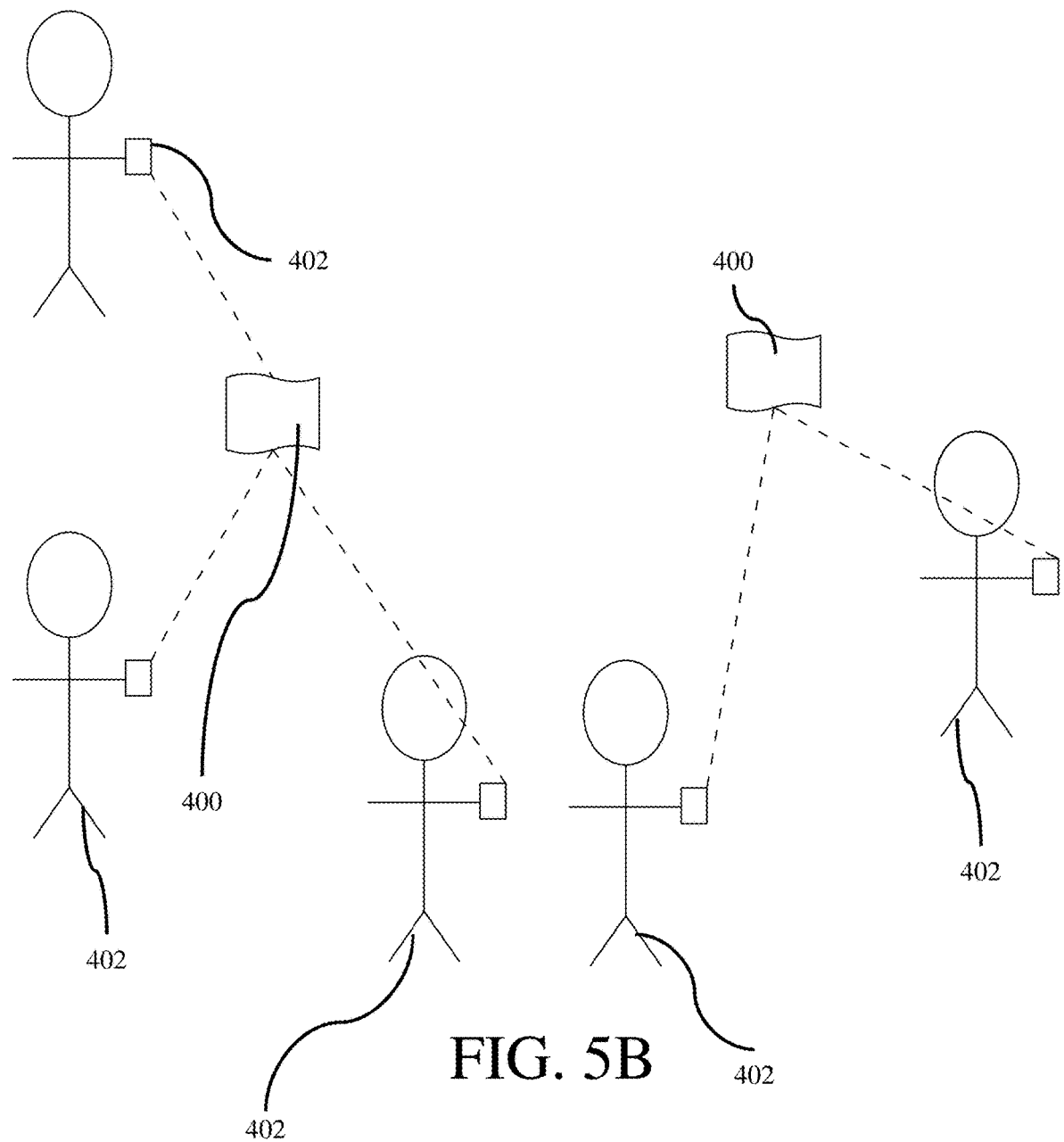
FIG. 5B depicts multiple users accessing varied content from the content store, each of the users viewing the content in its respective perspective.

As depicted in FIG. 5B, it will be appreciated that the same content can be retrieved and viewed by multiple users in a specific location. In the case where the video viewer 400 is virtually anchored to the real-world location, each of the users 402 will experience the content based on the user's orientation relative to the geospatial characteristics of the video viewer 400. That is, the user's 402 perspective of the video viewer 400 will be different depending on the user's 402 position relative to the video viewer 400.

In another embodiment (not depicted) the content is projected into the real world. In this embodiment, instead of showing the content through the mobile device's display, the content is projected (via a projector on the mobile device or an external projector) on a real-world surface (e.g., a wall, object, window, projection screen, etc.) so that the content appears in the real world.

In yet another embodiment where the mobile device includes a heads-up (or virtual reality or augmented reality) display, the content is projected back into the user's eye. Examples of heads-up displays, augmented reality headsets, and virtual reality headsets include, but are not limited to, the SAMSUNG GALAXY VR, OCULUS RIFT, HTC VIVE, GOOGLE DAYDREAM, MICROSOFT AR HEADSET, GOOGLE VR, etc.

In some embodiments the mobile device is capable of displaying content and/or content thumbnails in an Augmented Reality Mode (AR Mode). If the mobile device is not capable of displaying content in AR Mode, or if the mobile device has AR Mode disabled, the search results are presented in a list and/or map view.

If the mobile device is capable of displaying content in AR Mode, then the mobile device will present the content and/or content thumbnails in either a regular mode or a quadrant view mode depending on whether quadrant view mode has been selected.

In another embodiment the search can be further refined by search parameters and/or terms other than geospatial position information. These can include search parameters and/or terms that are manually input, obtained from a collaborative filter, or taken from predefined user preferences.

Figure 6:
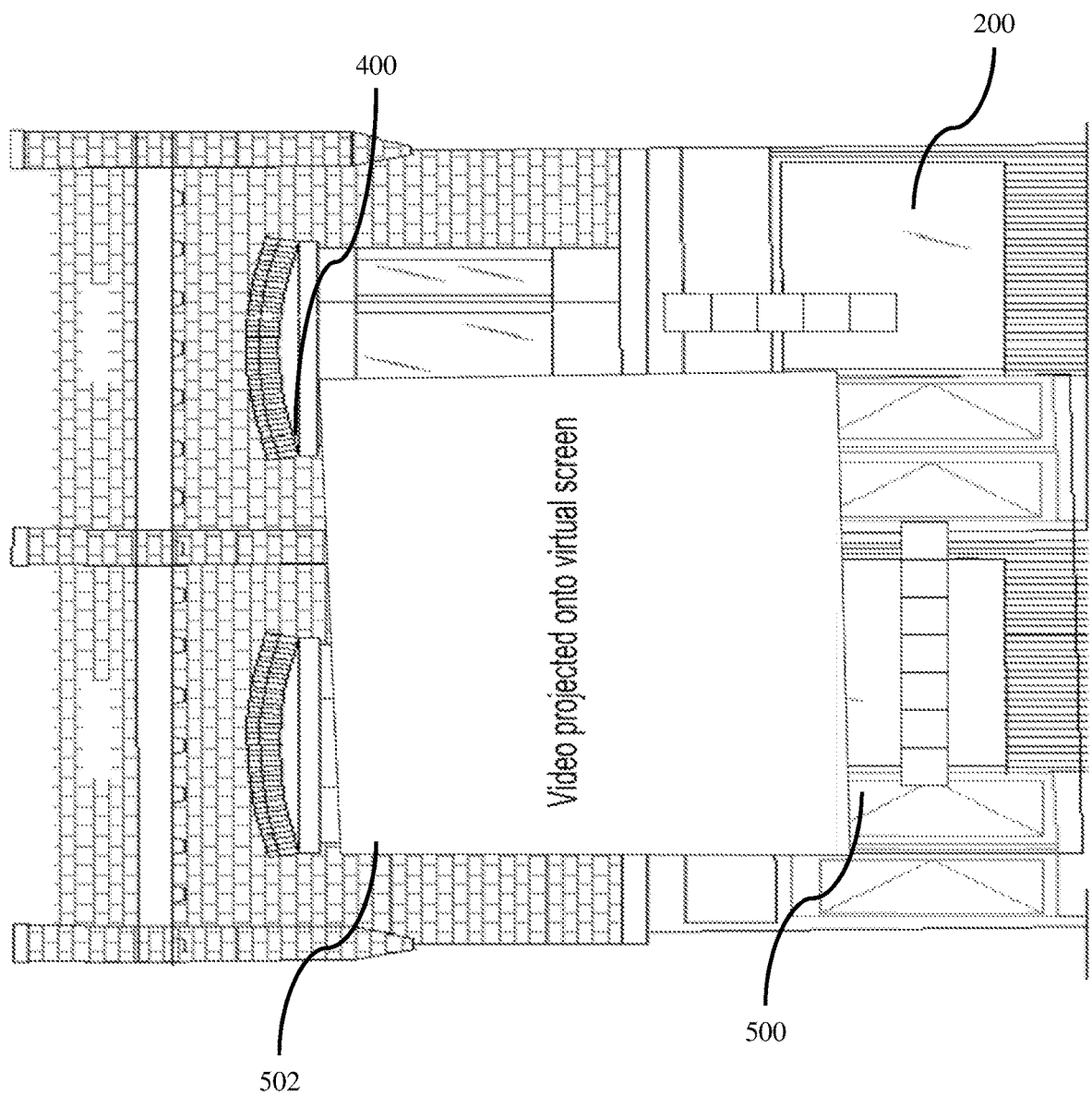
FIG. 6 depicts a content projected onto a virtual screen that remains in a stationary position relative to the real environment (as viewed through the device's video camera) as the mobile computing device is moved or rotated. Collaborative filter results and user preference filter results are also depicted as overlays on the real-world environment (as viewed through the device's video camera).

The results of the search will be geographically tagged virtual objects/contents with the applicable search parameters/terms/filters applied. For example, FIG. 6 depicts a display on a mobile device having a collaborative filter interface 502 and a user preference filter interface 500.

In some embodiments the search request will include search filter data. This search filter data can include, but is not limited to, user filter data and/or collaborative filter data. These search filters further refine the search for content on the content store, reducing the set of returned content as specified by the filters.

If no filter data is included in the search request, then the content store returns all search results from the content store that corresponds to the mobile device's location. These search results are then presented on the mobile device via the display.

The user interacts with the filters on the mobile device to select filter settings, modify search parameters, or select filtered content. It will be appreciated that interacting with a mobile device is known. Interacting with a mobile device includes, but is not limited to, listening to and responding to voice commands, tracking eye movements, tracking the position (e.g., yaw, roll, pitch) of the device, joysticks, touchscreens, etc.

In some embodiments the content returned by the content store is first filtered at the mobile device by a collaborative filter, a user preference filter, or both.

In another embodiment the content store performs the filtering on behalf of the mobile device.

Referring again to FIG. 6, a collaborative filter interface 502 is rendered proximate to a virtual content viewer 400 is provided. It will be appreciated that the position of the collaborative filter interface 502 can be in any reasonable location relative to the virtual content viewer 400. Furthermore, if there is insufficient data to complete a collaborative filtered result, the interface will appear empty until sufficient collaborative user data is available to filter results.

The collaborative filter filters content to present to a user by collecting and analyzing how the content is being accessed and used by all users. In an embodiment metadata is collected from all users. This metadata includes, but is not limited to, data on the search terms frequently used in a geographic location, how the content is accessed, whether the content is viewed to completion, the time of day the content is accessed, the order of content consumed, duration of content engagement, direction that content was viewed, how content was shared with contacts, environmental conditions at the location such as the weather, temperature, season, etc.

This metadata is analyzed and used to provide commonly used search parameters/terms/filters for that geographic location. For instance, if many users search for term "Italian restaurant" in a geographic location, the collaborative filter will display "Italian Restaurant" as a selectable search filter in that location. The user can then select the "Italian Restaurant" filter to display all content relevant to "Italian Restaurant" in that location. Alternately, the content may appear under a category labeled "Italian Restaurants" if it is determined that the content is relevant to the user.

In another embodiment the metadata may also include social network information (e.g., friends from FACEBOOK, INSTAGRAM, SNAPCHAT, etc.) associated with the user. In this embodiment, only search results associated with a user's social network will be displayed, rather than for all users. This further refines the search results to those search terms/filters that are relevant to that user and that user's social network.

In yet another embodiment, the collaborative filter uses a user's explicitly stated preferences and compares the preferences to the viewing habits of other users. In this embodiment the collaborative filter uses the viewing habits of an entire demographic (e.g., similar age, gender, economic status, profession, etc.) to recommend content to the user and/or filter content that would likely be ignored by the user. The collaboratively filtered content (and/or thumbnails) are sorted and presented to the user in its own category (audience preferences). For instance, in an example the content may be ordered based on the viewing habits of other users the duration of content engagement, the direction that content was viewed and how content was shared to contacts.

If sufficient collaborative filtered results exist for the location and content being viewed, those results will also be included to show only the content that the user is most likely to want in regular view. The user will have an option to toggle collaborative filtering on and off to control if it influences their search results.

Referring again to FIG. 6, a user preference filter interface 500 is rendered proximate to a virtual content viewer 400. It will be appreciated that the position of the user preference filter interface 500 can be in any reasonable location relative to the virtual content viewer 400.

Furthermore, if there is insufficient data to complete a collaborative filtered result, the interface will appear empty until sufficient collaborative user data is available to filter results.

The user preference interface 500 allows users to select preferred search terms. This can include, but is not limited to, a user's topics of interest, content from preferred sources such as friends and colleagues, subject/topic of content, length of content, author of content, posting date, popularity ratings, recommendations, etc. The content returned to a user based on the geographic location of the mobile device will then be filtered using these user preferences. As such, different users having different user preferences will be returned different content.

Content that is shown to a user in sliced view may be further refined by comparing the actual viewing habits of a user with her stated user preferences. For example, if a user frequently chooses content about music recommended by friends rather than her selected preference of local history, then her preference can be overrode by her usage patterns (i.e., she will receive more music content returned from the search).

The content that defaults as the first content presented in the main content viewing area is the user stated preference content search result with the highest match to the user preferences and the user's previous viewing habits. The user can then drag another content item to from either the user stated preference content that is to the left or right of the main content axis or collaborative filtered content that is below or above the main content axis. The content that is selected by the user as well identifying characteristics that could help rate or sort content and user preferences is sent back to the server. Identifying characteristics could be information such as duration of time engaging with the content, previous content watched and direction of viewing is logged on the server to further enhance both the user specific preferences as well as the collaborative filtering. Another user, viewing content at that same geographic location may get different content shown to them from the database due to different user preferences.

When the user is in regular view, content will still be sorted using user preferences and previous usage habits.

Figure 7:
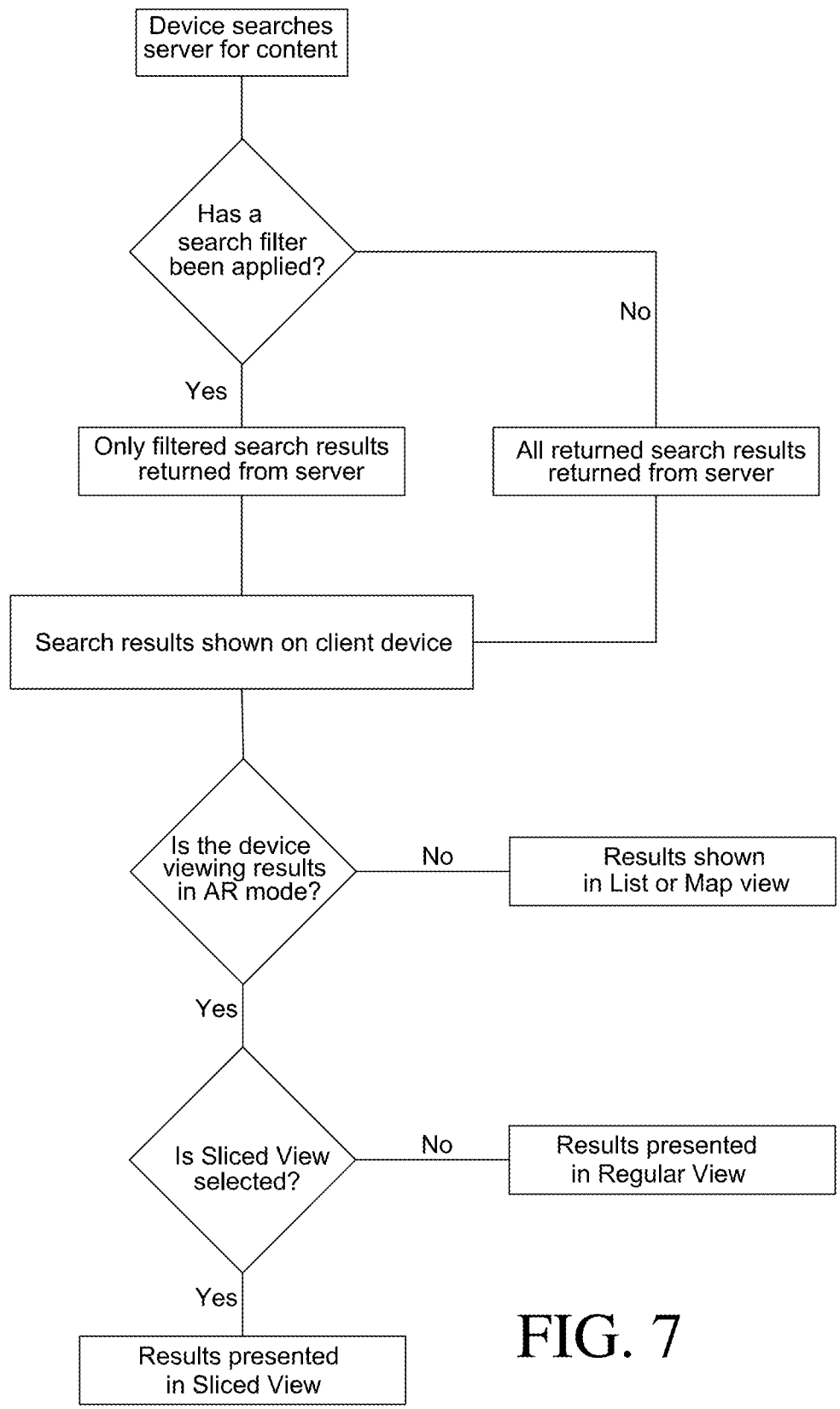
FIG. 7 depicts a method for retrieving geographically tagged contents from a content store.

Referring now to FIG. 7, a flowchart depicting an embodiment method is provided. In this embodiment the mobile device first sends a request to the content store to search for content. The search request includes the mobile device's geospatial information. The content store uses this geospatial information to search for content at or near the mobile device's location. This search can also include content having the same orientation and position as the mobile device.

In this embodiment the search request from the mobile device includes filter information from any one or a combination of the collaborative filter or the user preference filter. If the search request includes filter information, then the content is filtered at the server and only those search results matching the filter criteria are returned. If the search request does not include any filter information then the server returns all search results.

Once the search results are returned to the mobile device the mobile device displays the search results to the user. The search results can contain the content itself or content thumbnails having a link to the content. How the content and/or content thumbnails are presented to the user depends on the mobile device being used (e.g., mobile phone, ar/vr headset, tablet, mobile phone with a projector, etc). User preferences can also be used to determine how the content and/or content thumbnails are displayed on the mobile device.

As is depicted in FIG. 7, the mobile device is capable of displaying content in AR (augmented reality) mode that can toggled by the user. If the user has turned off AR mode, then the content and/or content thumbnails are displayed in a list or map view. If the user has AR mode activated, then the content and/or content thumbnails are displayed in AR mode.

In this embodiment the user may also select whether to view the content and/or content thumbnails in regular view or sliced view, and the content and/or content thumbnails will be displayed to the user accordingly.

Figure 8:
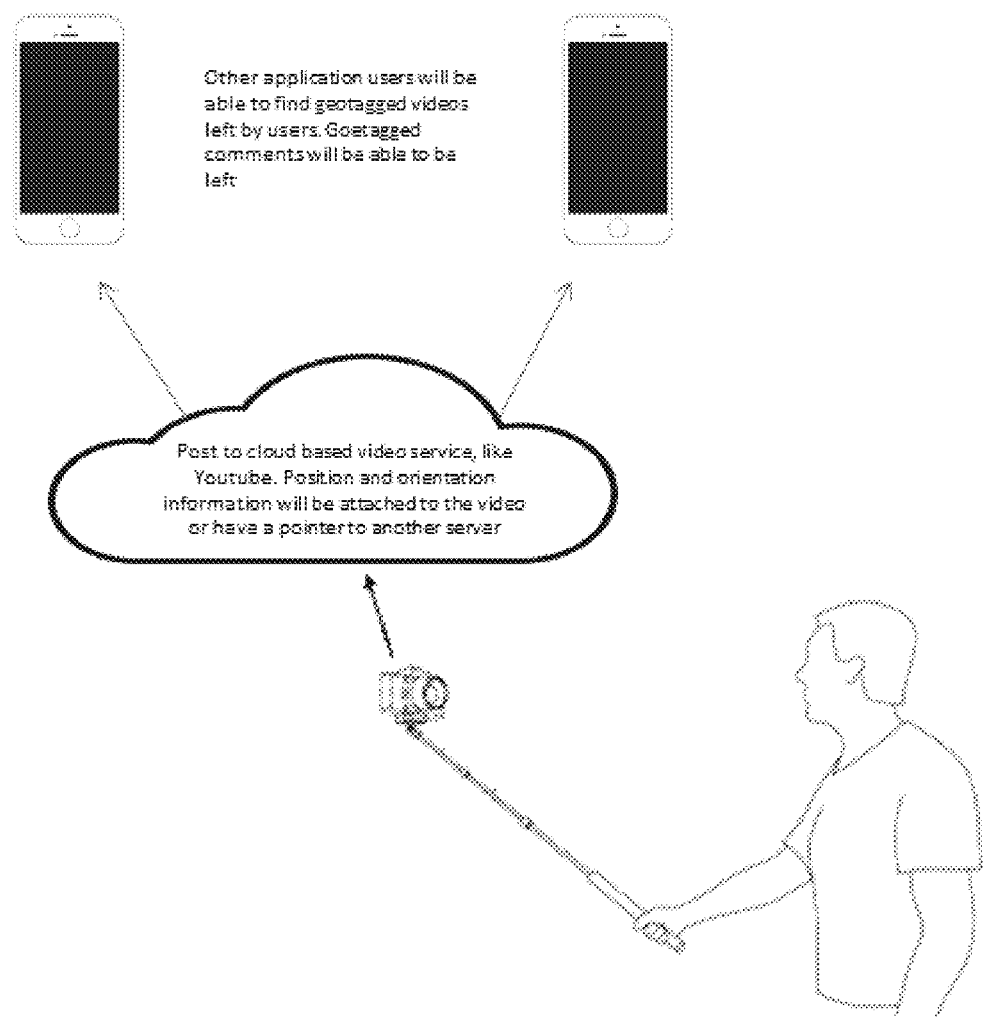
FIG. 8 depicts an individual recording content for upload to the content store.

Referring now to FIG. 8, a user may also create geographically tagged virtual objects/contents or information at the geographic location and upload it to the content store so that it will be viewable by others. For example, the user can record a content or leave a written comment that includes device collected geospatial information (i.e., location information+relative position and orientation information collected from the mobile device).

This user-generated and geospatially-tagged content is then posted to a content store. In one example, the content is uploaded directly to popular content hosting or social networking sites such as YOUTUBE, with geospatial information (including orientation and rotation information) included in one of the searchable fields.

In another embodiment, only the content is stored on popular content hosting or social networking sites, while geospatial data corresponding to the content and a link to the content is stored on a separate content store. When retrieving content in this example, the mobile device first searches the content store containing the geospatial data and link to the content for relevant content. The link can then be followed at the mobile device to obtain the content itself.

Once content has been recorded, but before being uploaded to the content store, the user has the option of editing the recorded content. In one embodiment, a dashboard is provided on the mobile device that allows the individual to edit the length or order of a video sequence, change sound, add additional positional information, add access/permissions rules for future users, allow completed viewing of the virtual object/content to trigger a secondary event of object (as a reward for completion), etc.

Figure 9:
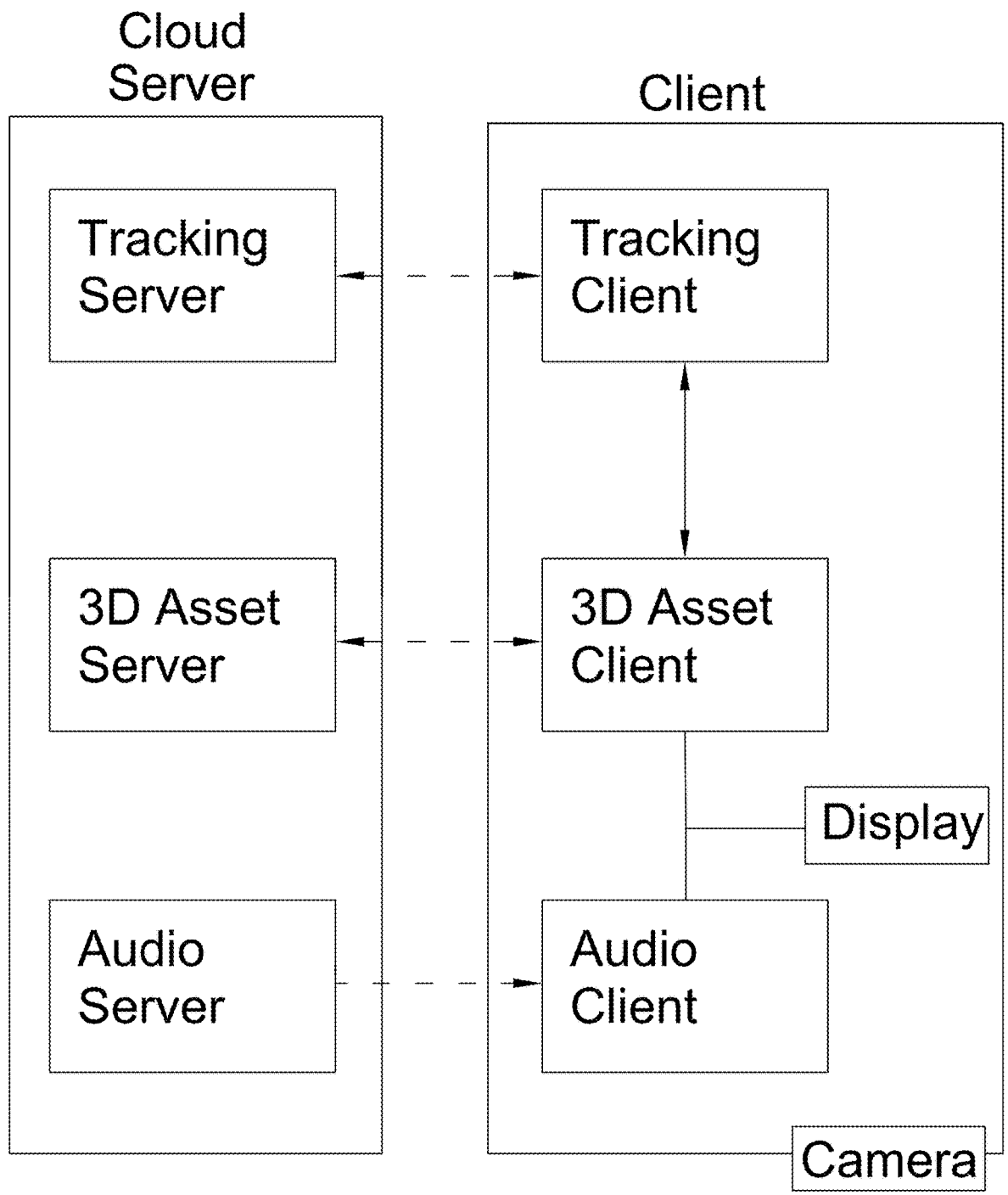
FIG. 9 depicts an embodiment system.

Referring now to FIG. 9, an example system implementing disclosed methods is provided. This example system includes a content server and a client.

The client includes a tracking client for tracking the geospatial information (e.g., geolocation and position information) of the mobile device.

The client also includes a 3D asset client for storing retrieved 3D content, storing cached 3D content, and playing and interacting with 3D content. In an embodiment, the client incorporates functionality from a UNITY client.

The client further includes an audio client for playing back audio content retrieved from the content store.

The client also includes devices and interfaces commonly found in mobile devices including, but not limited to, a display for presenting information to a user and a camera for capturing content and capturing a live video feed for mixing with content from the content store.

It will be appreciated that the client can be implemented on any general purpose computing device having a display, camera, input, storage, and tracking capabilities (e.g., GPS, gyroscopes, etc.). Examples include, but are not limited to, mobile phones, tablet computers, AR/VR headsets, and laptop computers.

The content server includes (but is not limited to) a tracking server. The tracking server accepts requests for content from a mobile device. The request includes a mobile device's geospatial information as well as filter information from the collaborative filter, the user preference filter, or both.

The cloud server further includes a 3D asset server for storing and serving 3D content. In this embodiment the 3D asset server is a UNITY server. Once content is located, content matching the geospatial information and filter parameters is retrieved from the 3D asset server and returned to the client.

In another embodiment, the search results returned to the mobile device includes links to content that is stored on a content sharing website (e.g., YOUTUBE) or a social media network (e.g., FACEBOOK).

The server further includes an audio server for supplying audio content corresponding to the content to the mobile device.

It will be appreciated that the content server can be implemented on any general-purpose computing device such as a server class computer, a desktop computer, a laptop, etc. The content server may also be implemented in a virtualized computing instance in a cloud-computing environment. Examples of cloud-computing environments include, but are not limited to MICROSOFT AZURE, AMAZON EC2, GOOGLE COMPUTE ENGINE.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method for delivering content to mobile devices comprising:
    determining a geospatial position of a first mobile device and a second mobile device capable of determining their geospatial location;
    determining a first viewing orientation of the first mobile device and a second viewing orientation of the second mobile device capable of determining their viewing orientation;
    requesting, from a content store, a content having geospatial location information and presentation orientation information that is within a range of the geospatial location of first mobile device and the second mobile device, the presentation orientation information including a viewing direction of the content;
    retrieving an iconic representation for the content from the content store, wherein the content corresponds to a real world object within view of a camera of the first mobile device and the second mobile device; and
    presenting the iconic representation on the first mobile device and the second mobile device so that the iconic representation on the first mobile device appears between the geospatial position of the first mobile device and the geospatial location information of the content and detached from the real-world object, and so that the iconic representation on the second mobile device also appears between the geospatial position of the second mobile device and the geospatial location information of the content and detached from the real-world object;
    wherein the iconic representation is combined with live videos captured by the first mobile device and the second mobile device to provide a mixed reality view so that the iconic representation is positioned in the mixed reality view and the position of the iconic representation varies as a function of the viewing orientation and the geospatial position for each of the first mobile device and the second mobile device, and the geospatial location information and the presentation orientation information of the content; and
    further wherein, the geospatial location information and the presentation orientation information of the content is for anchoring the content or the iconic representation or both to the geospatial location with the presentation orientation relative to the real-world, such that the content displayed on the first mobile device is presented from the first viewing orientation and the content displayed on the second mobile device is presented from the second viewing orientation.

2. The method of claim 1 wherein the retrieving of the content from the content store is executed once the iconic representation corresponding to the content is selected on the first mobile device and/or the second mobile device.

3. The method of claim 2 wherein the content is combined with the live videos captured by the first mobile device and the second mobile device to present a mixed reality view on the first mobile device and the second mobile device.

4. The method of claim 2 wherein the content is projected from the first mobile device and the second mobile device.

5. The method of claim 2 wherein the content is presented through a heads-up display of the first mobile device and/or the second mobile device.

6. The method of claim 2 wherein the content is presented through a heads-up display connected to the first mobile device and/or the second mobile device.

7. The method of claim 2 wherein the content is combined with the live videos captured by the first mobile device and the second mobile device to present a mixed reality view on the first mobile device and the second mobile device so that the content is positioned according to the content's geospatial location information and presentation orientation information.

8. The method of claim 1 wherein the iconic representation is presented in a sliced view.

9. The method of claim 1 wherein when more than one iconic representation is retrieved from the content store, the iconic representations are grouped into sections along a horizontal plane and displayed along the horizontal plane.

10. The method of claim 1 wherein when more than one iconic representation is retrieved, the iconic representations are grouped into sections along a vertical plane and displayed along the vertical plane.

11. The method of claim 1 wherein the iconic representation is presented as a list.

12. The method of claim 1 wherein a marker is presented on a map displayed on the first mobile device and/or the second mobile device such that the marker is associated with the iconic representation that corresponds to the geospatial positioning information of the iconic representation.

13. The method of claim 1 wherein the content is filtered at the content store using a user-defined filter.

14. The method of claim 1 wherein the content is filtered at the content store using a collaborative filter.

15. The method of claim 1 wherein the iconic representation or the content or both moves the geospatial location of the content or the presentation orientation or both with the first mobile device and/or the second mobile once the first mobile device and/or the second mobile device moves the geospatial position or the viewing orientation or both so that the iconic representation or the content or both follows the first mobile device and/or the second mobile device.

16. The method of claim 1, wherein the iconic representation of the content appears stationary in the mixed reality view.

17. The method of claim 1, wherein the iconic representation is displayed with a shape that is independent of a shape of the real-world object.

18. A method for creating media content comprising:
determining a geospatial location of a first mobile device;
determining a recording orientation of the first mobile device;
recording a content corresponding to a real world object in a first viewing orientation of a camera on the first mobile device;
associating the content with the geospatial location and the recording orientation; and
wherein the recording orientation is used as a presentation orientation for displaying the content so that a representation of the content appears between the geospatial position of a second mobile device and a third mobile device and the geospatial location information associated with the content and detached from the real-world object, the presentation orientation including a viewing direction of the content, such that the content displayed on the second mobile device is presented from a second viewing orientation and the content displayed on the third mobile device is presented from a third viewing orientation, and the position of the content varies as a function of the viewing orientation and the geospatial position for each of the second mobile device and the third mobile device.

19. The method of claim 18 further comprising:
storing the content with the geospatial location and the presentation orientation on a content store.

20. The method of claim 18 further comprising:
storing the content in a content store; and
storing the geospatial location, the presentation orientation, and a link to the content in a secondary content store.

21. A method for delivering content to mobile devices comprising:
determining a geospatial position of a first mobile device and a second mobile device capable of determining their geospatial location;
determining a first viewing orientation of the first mobile device and a second viewing orientation of the second mobile device capable of determining their viewing orientation;
requesting, from a content store, a content having geospatial location information and presentation orientation information that is within a range of the geospatial location of the first mobile device and the second mobile device, the presentation orientation information including a viewing direction of the content;
retrieving the content from the content store; and
presenting the content on the first mobile device and the second mobile device;
wherein the content corresponds to a real world object within a view of a camera of the first mobile device and the second mobile device and the content is combined with live videos captured by the first mobile device and the second mobile device to provide a mixed reality view so that the content displayed on the first mobile device is positioned between the geospatial position of the first mobile device and the geospatial location information of the content and detached from the real-world object in the mixed reality view and the position of the content varies as a function of the viewing orientation of the first mobile device and the geospatial position, and the geospatial location information and presentation orientation information of the content, and so that the content displayed on the second mobile device is also positioned between the geospatial position of the second mobile device and the geospatial location information of the content and detached from the real-world object in the mixed reality view and the position of the content varies as a function of the viewing orientation of the second mobile device and the geospatial position, and the geospatial location information and presentation orientation information of the content; and
further wherein, the geospatial location information and the presentation orientation information of the content is for anchoring the content or an iconic representation or both at the geospatial location with the presentation orientation in the real-world, such that the content displayed on the first mobile device is presented from the first viewing orientation and the content displayed on the second mobile device is presented from the second viewing orientation.

22. The method of claim 21 further comprising:
retrieving the iconic representation from the content store once the content is selected on the first mobile device and the second mobile device; and
presenting the iconic representation on the first mobile device and the second mobile device.

23. A method for delivering content to multiple devices comprising:
determining a geospatial position of each mobile device of the multiple mobile devices, and each mobile device capable of determining its geospatial location;
determining a viewing orientation of each mobile device of the multiple mobile devices, and each mobile device capable of determining its viewing orientation;
retrieving a content, from the content store, by each mobile device of the multiple mobile devices, the content having geospatial location information and presentation orientation information that is within a range of the geospatial location of each mobile device of the multiple mobile devices, the presentation orientation information including a viewing direction of the content; and
presenting the content on each mobile device of the multiple mobile devices;
wherein the content corresponds to a real-world object within a view of a camera of each of the multiple mobile devices and the content is combined with a live video captured by each mobile device of the multiple mobile devices to provide a mixed reality view that the content is positioned in the mixed reality view and the position of the content varies as a function of the viewing orientation and the content is detached from the real-world object, the geospatial position of each mobile device of the multiple mobile devices and the geospatial location information and the presentation orientation information of the content; and further wherein, the geospatial location information and the presentation orientation information of the content is for anchoring the content or an iconic representation of the content or both to the geospatial location with the presentation orientation relative to the real-world, such that the content displayed on the first mobile device is presented from the first viewing orientation and the content displayed on the second mobile device is presented from the second viewing orientation.

\* \* \* \* \*